(12) United States Patent
Yoshikawa

(10) Patent No.: US 6,979,981 B2
(45) Date of Patent: Dec. 27, 2005

(54) DC-DC CONVERTER CONTROL CIRCUIT AND DC-DC CONVERTER

(75) Inventor: Noriaki Yoshikawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 191 days.

(21) Appl. No.: 10/617,799

(22) Filed: Jul. 14, 2003

(65) Prior Publication Data
US 2004/0207372 A1   Oct. 21, 2004

(30) Foreign Application Priority Data
Apr. 21, 2003  (JP) .............................. 2003-115861

(51) Int. Cl.$^7$ ............................................. H02M 1/56
(52) U.S. Cl. ................................... 323/225; 323/285
(58) Field of Search .............................. 323/225, 283, 323/284, 285, 288, 290, 242, 246

(56) References Cited

U.S. PATENT DOCUMENTS

| | | | |
|---|---|---|---|
| 5,408,150 A | 4/1995 | Wilcox | 327/108 |
| 6,057,675 A * | 5/2000 | Tateishi | 323/283 |
| 6,396,252 B1 * | 5/2002 | Culpepper et al. | 323/285 |

FOREIGN PATENT DOCUMENTS

| | | |
|---|---|---|
| JP | 2-151271 | 6/1990 |
| JP | 3-169266 | 7/1991 |
| JP | 9-117131 | 5/1997 |
| JP | 11-32477 | 2/1999 |
| JP | 11-187651 | 7/1999 |

* cited by examiner

*Primary Examiner*—Jessica Han
(74) *Attorney, Agent, or Firm*—Oblon, Spivak, McClelland, Maier & Neustadt, P.C.

(57) ABSTRACT

A DC-DC converter control circuit disclosed herein comprises a first switching element having a first terminal to which a first voltage is supplied and a second terminal which is connected to an output node; a second switching element having a first terminal which is connected to the output node and a second terminal to which a second voltage lower than the first voltage is supplied; and a control circuit which outputs a first control signal to a control terminal of the first switching element and outputs a second control signal to a control terminal of the second switching element so as to control on/off states of the first switching element and the second switching element, wherein the control circuit switches the second switching element from the off state to the on state after detecting that the first switching element is in the off state when switching the second switching element from the off state to the on state.

10 Claims, 6 Drawing Sheets

DC-DC CONVERTER CONTROL CIRCUIT AND DC-DC CONVERTER

CROSS REFERENCE TO RELATED APPLICATION

This application claims benefit of priority under 35 U.S.C.§119 to Japanese Patent Application No. 2003-115861, filed on Apr. 21, 2003, the entire contents of which are incorporated by reference herein.

BACKGROUND OF THE INVENTION

1. Field of the Invention

The present invention relates to a DC-DC converter control circuit and a DC-DC converter, and particularly relates to a DC-DC converter control circuit and a DC-DC converter in which simultaneous on states of its high side and low side are avoided.

2. Description of the Related Art

FIG. 1 is a diagram showing the circuit configuration of a related DC-DC converter control circuit. As shown in FIG. 1, the DC-DC converter control circuit includes a control circuit 10 and transistors Q1 and Q2.

This DC-DC converter operates as follows. First, (1) when an input control signal IN is low, an output of a NAND circuit ND1 is high. This output of the NAND circuit ND1 is inputted to a high-side level shift circuit 30. The high-side level sift circuit 30 is a circuit which raises a signal using a ground voltage as a reference to a signal using a voltage VLX of a node LX as a reference. Therefore, when an input to the level sift circuit 30 is high, the level sift circuit 30 outputs a signal which is at a high level relative to the voltage VLX as the reference.

Accordingly, when the input control signal IN is low, the level shift circuit 30 outputs a high, whereby the transistor Q11 is switched on and the transistor Q12 is switched on. Hence, a node HO is low, and the transistor Q1 which is a main switching element is in an off state.

A mask time setting circuit 40 is a circuit which delays the input control signal IN for a predetermined period of time and then outputs it to the NAND circuit ND1 and a NOR circuit NR1. Therefore, when the input control signal IN is in a low-level stable state, the mask time setting circuit 40 outputs a low-level signal. As a result, the NOR circuit NR1 outputs a high-level output to an inverter circuit INV1. Hence, an input to a level shift circuit 32 is low.

The level shift circuit 32 is a circuit which is provided to be matched with the high-side level sift circuit 30 and outputs an inputted signal without change. Therefore, an output of the level shift circuit 32 is low, whereby a transistor Q21 is switched on, and a transistor Q22 is switched off. As a result, a node LO goes high, and the transistor Q2 which is a switching element for synchronous rectification is switched on. Thereby, an output node is connected to a ground via the transistor Q2, and an output voltage OUT1 drops. With the drop in the output voltage OUT 1, an output voltage OUT2 between an inductance L1, and a capacitor C1 and a load R also drops.

(2) When the input control signal IN changes from low to high, the output of the NOR circuit NR1 goes low, and an output of the inverter signal INV1 goes high. Therefore, the output of the low-side level shift circuit 32 goes high, whereby the transistor Q21 is switched off, and the transistor Q22 is switched on. Hence, a node LO goes low, and the transistor Q2 is switched off.

On the other hand, the NAND circuit ND1 outputs a high as heretofore until the output of the mask time setting circuit 40 goes high. Accordingly, the transistor Q1 remains off. After the predetermined period of time, the output of the mask time setting circuit 40 changes from low to high.

As a result, the output of the NAND circuit ND1 goes low, and the output of the level shift circuit 30 also goes low. Hence, the transistor Q11 is switched on, and the transistor Q12 is switched off. Consequently, the node HO goes high, and the transistor Q1 is switched on. Accordingly, an input voltage VIN is supplied to the output node via the transistor Q1, whereby the output voltages OUT1 and OUT2 rise.

(3) when the input control signal IN changes from high to low, the output of the NAND circuit ND1 goes high. Therefore, the output of the high-side level shift circuit 30 goes high, whereby the transistor Q11 is switched off and the transistor Q12 is switched on. Hence, the node HO goes low, and the transistor Q1 is switched off.

On the other hand, the NOR circuit NR1 outputs a high as heretofore until the output of the mask time setting circuit 40 goes low. Accordingly, the transistor Q2 remains off. After the predetermined period of time, the output of the mask time setting circuit 40 changes from high to low.

As a result, the output of the NOR circuit NR1 goes high, and the output of the inverter circuit INV1 goes low. The output of the level shift circuit 32 also goes low, whereby the transistor Q21 is switched on, and the transistor Q22 is switched off. Consequently, the node LO goes high, and the transistor Q2 is switched on. Accordingly, the output node is connected to the ground via the transistor Q2, and the output voltage OUT1 drops.

FIG. 2 is a diagram showing an example of operation waveforms of the DC-DC converter control circuit shown in FIG. 1. FIG. 2 shows level changes of the node LO and the node HO when the input control signal IN changes from high to low and thereafter changes from low to high.

When the input control signal IN changes from high to low, the transistor Q1 switches from the on state to the off state, and the transistor Q2 switches from the off state to the on state. In this case, in order to avoid simultaneous on states of the transistor Q1 and the transistor Q2, it is necessary that the transistor Q2 is switched on after the transistor Q1 is switched off. Therefore, the node HO changes from high to low, after being delayed for a delay time toff which is required for the operation of each element after the input control signal IN changes from high to low, whereas the node LO changes from low to high, after being delayed for a delay time ton of the mask time setting circuit 40 after the input control signal IN changes from high to low.

This applies to a case where the input control signal IN changes from low to high, and hence the transistor Q2 is switched off after being delayed for the delay time toff, and the transistor Q1 is switched on after being delayed for the delay time ton.

Such a DC-DC converter control circuit is disclosed, for example, in Japanese Patent Laid-open NO. Hei 9-117131, Japanese Patent Laid-open No. Hei 11-32477, and Japanese Patent Laid-open No. Hei 11-187651.

In the circuit shown in FIG. 1, however, the delay time of the mask time setting circuit 40 needs to have a sufficient margin in consideration of variations in elements. Namely, the delay time of the mask time setting circuit 40 needs to be set long so as to prevent simultaneous on states of the transistor Q1 and the transistor Q2.

Hence, there arises a problem that the time required from when the high level/low level of the input control signal IN is changed until the transistor Q1 or the transistor Q2 is switched to the on state becomes longer and thereby the response of the circuit is deteriorated. However, unless the delay time of the mask time setting circuit 40 is set sufficiently long, the transistor Q1 and the transistor Q2 are simultaneously switched on, which causes an increase in power consumption, and at the worst, causes the possibility of destroying elements.

SUMMARY OF THE INVENTION

In order to accomplish the aforementioned and other objects, according to one aspect of the present invention, a DC-DC converter control circuit, comprises:

a first switching element having a first terminal to which a first voltage is supplied and a second terminal which is connected to an output node;

a second switching element having a first terminal which is connected to the output node and a second terminal to which a second voltage lower than the first voltage is supplied; and a control circuit which outputs a first control signal to a control terminal of the first switching element and outputs a second control signal to a control terminal of the second switching element so as to control on/off states of the first switching element and the second switching element, wherein the control circuit switches the second switching element from the off state to the on state after detecting that the first switching element is in the off state when switching the second switching element from the off state to the on state.

According to another aspect of the present invention, a DC-DC converter, comprises:

a first switching element having a first terminal to which a first voltage is supplied and a second terminal which is connected to an output node;

a second switching element having a first terminal which is connected to the output node and a second terminal to which a second voltage lower than the first voltage is supplied;

a feedback circuit which compares a voltage of the output node with a reference voltage so as to generate a first control signal, wherein the feedback circuit outputs the first control signal; and a control circuit to which the first control signal is inputted and which controls a second control signal to be outputted to a control terminal of the first switching element and a third control signal to be outputted to a control terminal of the second switching element based on the first control signal so as to control on/off states of the first switching element and the second switching element, wherein the control circuit switches the second switching element from the off state to the on state after detecting that the first switching element is in the off state when switching the second switching element from the off state to the on state.

DETAILED DESCRIPTION OF THE EMBODIMENTS

In this embodiment, in a DC-DC converter control circuit including a low-side transistor and a high-side transistor, the on/off state of the high-side transistor is detected, and when the low-side transistor is switched from an off state to an on state, the low-side transistor is switched to the on state after the switching of the high-side transistor from the on state to the off state is detected. Further details will be given below.

Figure 3:
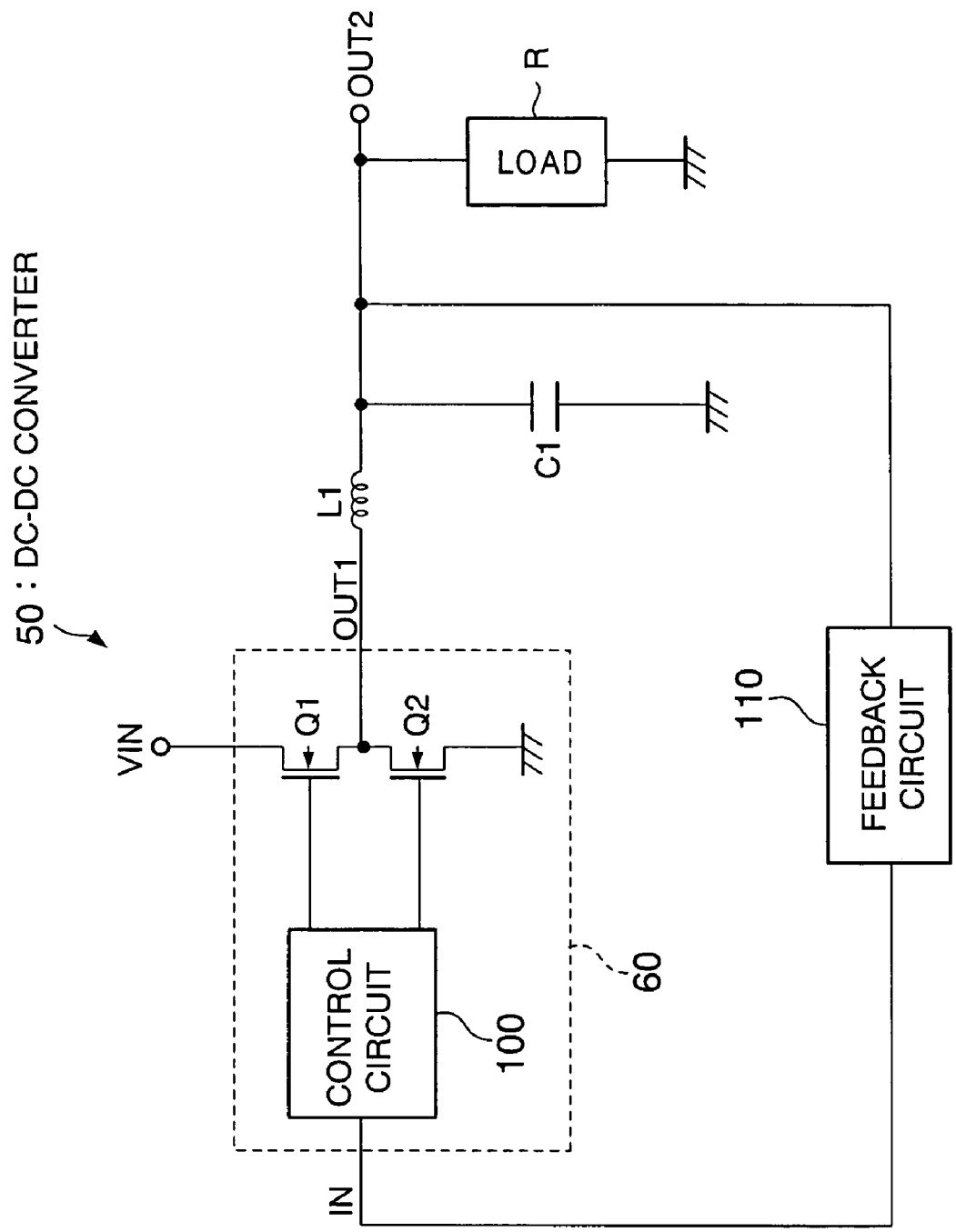
FIG. 3 is a diagram showing the schematic configuration of a DC-DC converter according to an embodiment.

FIG. 3 is a diagram showing the schematic configuration of a DC-DC converter 50 according to this embodiment. As shown in FIG. 3, the DC-DC converter 50 according to this embodiment includes transistors Q1 and Q2, a control circuit 100, a feedback circuit 110, an inductance L1, and a capacitor C1. A load R is connected between the inductance L1 and the capacitor C1. In this embodiment, the control circuit 100 and the transistors Q1 and Q2 are formed as one IC60, and this IC60 corresponds to a DC-DC converter control circuit in this embodiment.

An input voltage VIN of this DC-DC converter 50 is inputted to the transistor Q1, and an output voltage OUT2 is outputted therefrom. The level to be shifted of the input voltage VIN, which is outputted as the output voltage OUT2, is determined by the on/off ratio between the transistor Q1 and the transistor Q2. Namely, it is controlled depending on the ratio in which the control circuit 100 turns on the transistor Q1 and the transistor Q2.

Figure 4:
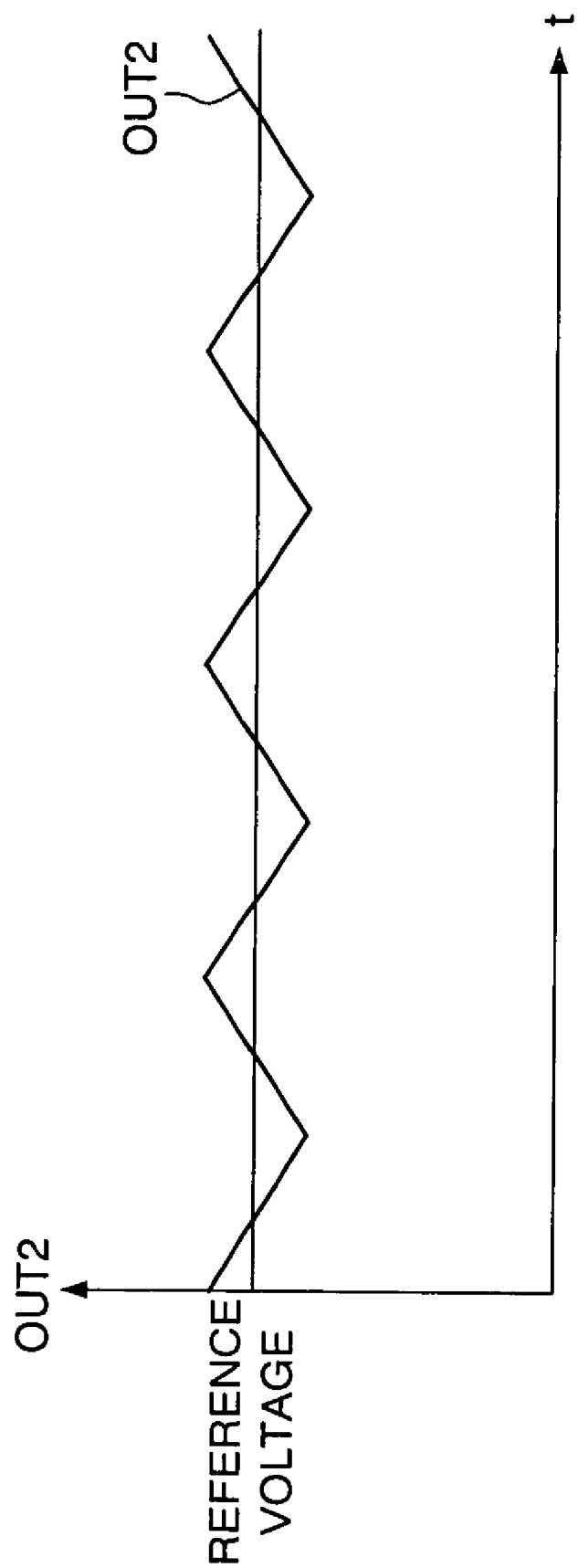
FIG. 4 is a diagram showing an example of a waveform of an output voltage of the DC-DC converter in FIG. 3.

More specifically, as shown in FIG. 4, the output voltage OUT2 rises when the transistor Q1 is on and the transistor Q2 is off, whereas it drops when the transistor Q1 is off and the transistor Q2 is on. The feedback circuit 110 acquires the voltage of the output voltage OUT2 and compares it with a reference voltage. The feedback circuit 110 outputs an input control signal IN of low level to the control circuit 100 when the output voltage OUT2 is higher than the reference voltage, and outputs the input control signal IN of high level to the control circuit 100 when the output voltage OUT2 is lower than the reference voltage. The control circuit 100 controls the on/off of the transistor Q1 and the transistor Q2 based on the level of the input control signal IN.

In other words, when the output voltage OUT2 is higher than the reference voltage, the control circuit 100 switches the transistor Q1 off and the transistor Q2 on. Contrary to this, when the output voltage OUT2 is lower than the reference voltage, the control circuit 100 switches the transistor Q2 off and the transistor Q1 on. By repeating the aforementioned operation, the voltage of the output voltage OUT2 is controlled to be equal to the reference voltage.

Figure 5:
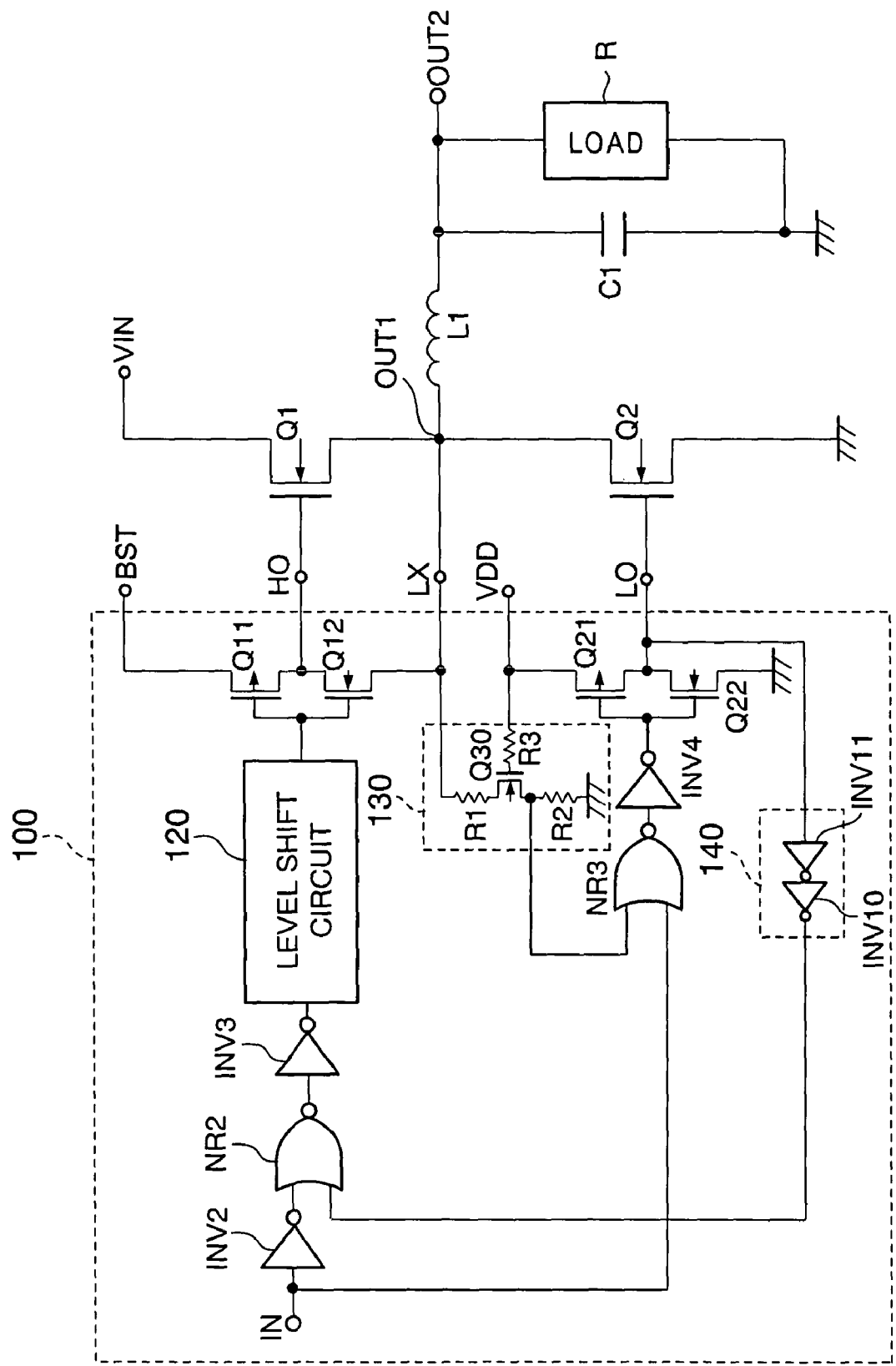
FIG. 5 is a diagram showing the circuit configuration of a DC-DC converter control circuit according to the embodiment.

FIG. 5 is a diagram showing the circuit configuration of the control circuit 100. As shown in FIG. 5, the control circuit 100 according to this embodiment includes inverter circuits INV2, INV3, and INV4, NOR circuits NR2 and NR3, a level shift circuit 120, a first detection circuit 130, a second detection circuit 140, and transistors Q11, Q12, Q21, and Q22.

In this embodiment, the transistor Q11 is a P-type MISFET, the transistor Q12 is an N-type MISFET, the transistor Q21 is a P-type MISFET, and the transistor Q22 is an N-type MISFET.

A voltage BST is supplied to a source terminal of the transistor Q11, and a drain terminal of the transistor Q11 is connected to a drain terminal of the transistor Q12. A source terminal of the transistor Q12 is connected to a node LX. The drain terminal of the transistor Q12 is also connected to a node HO. An output signal from the level shift circuit 120 is inputted to gate terminals of the transistor Q11 and the transistor Q12.

On the other hand, a voltage Vdd is supplied to a source terminal of the transistor Q21, and a drain terminal of the transistor Q21 is connected to a drain terminal of the transistor Q22. A source terminal of the transistor Q22 is connected to a ground. The drain terminal of the transistor Q22 is also connected to a node LO. An output signal from the inverter circuit INV4 is inputted to gate terminals of the transistor Q21 and the transistor Q22.

The level shift circuit 120 raises a signal using a ground voltage as a reference to a signal using a voltage VLX of a node LX as a reference. Therefore, when an input to the level sift circuit 120 is high, the level sift circuit 120 outputs a signal which is at a high level relative to the voltage VLX as the reference.

The first detection circuit 130 is a circuit to detect the switching of the transistor Q1 to the off state by monitoring the voltage of the node LX. In this embodiment, the first detection circuit 130 includes resistances R1, R2, and R3, and a transistor Q30 which is an N-type MISFET.

More specifically, one end of the resistance R1 is connected to the node LX, and the other end of the resistance R1 is connected to a drain terminal of the transistor Q30. A source terminal of the transistor Q30 is connected to one end of the resistance R2, and the other end of the resistance R2 is connected to a ground. One end of the resistance R3 is connected to a gate terminal of the transistor Q30, and the voltage VDD is supplied to the other end of the resistance R3. A signal outputted from a node between the transistor Q30 and the resistance R2 is inputted to the NOR circuit NR3.

The second detection circuit 140 is a circuit to detect the switching of the transistor Q2 to the off state by monitoring the voltage of the node LO. In this embodiment, the second detection circuit 140 is configured by connecting inverter circuits INV10 and INV11 in series. Namely, the second detection circuit 140 buffers and outputs the voltage of the node LO.

The transistor Q1 and the transistor Q2 each of which is an N-type MISFET are connected in series between the input voltage IN and a ground. Namely, the input voltage VIN is supplied to a drain terminal of the transistor Q1. A source terminal of the transistor Q1 is connected to a drain terminal of the transistor Q2 as well as to an output node. A source terminal of the transistor Q2 is connected to the ground.

A gate terminal of the transistor Q1 is connected to the node HO, and hence the on/off state of the transistor Q1 is controlled by the on/off states of the transistor Q11 and the transistor Q12. A gate terminal of the transistor Q2 is connected to the node LO, and hence the on/off state of the transistor Q2 is controlled by the on/off states of the transistor Q21 and the transistor Q22.

One end of the inductance L1 is connected to the output node. The other end of the inductance L1 is connected to one end of the capacitor C1 which is a smoothing capacitor. The other end of the capacitor C1 is connected to a ground. The load R is connected to a node between the inductance L1 and the capacitor C1, and the output voltage OUT2 is outputted therefrom.

The DC-DC converter operates as follows. First, it is assumed that the node LX is high. In this case, the transistor Q1 is on, and the transistor Q2 is off.

(1) It is assumed that the input control signal IN changes from high to low in this state. On the high side, an output of the inverter circuit INV2 goes high. Accordingly, an output of the NOR circuit NR2 is low, an output of the inverter circuit INV3 is high, and hence the level shift circuit 120 outputs a high.

Since the output of the level shift circuit 120 is high, the transistor Q11 is switched off, and the transistor Q12 is switched on, whereby the node HO goes low. Accordingly, the transistor Q1 switches from the on state to the off state.

On the other hand, on the low side, the low-level input control signal IN is inputted to the NOR circuit NR3. Since an output from the first detection circuit 130 is inputted to this NOR circuit NR3, an output of the NOR circuit NR3 does not go high unless the output from the first detection circuit 130 goes low.

Namely, when the node LX is high, the output of the first detection circuit 130 to the NOR circuit NR3 is voltage Vdd−Vgs(Q30)=R2×Ids(Q30). Here, Vgs(Q30) is the gate-source voltage of the transistor Q30, and Ids(Q30) is the drain-source current of the transistor Q30.

In this case, if R2 is increased, Ids(Q30) can be limited to a small current. Correspondingly, Vgs(Q30) also decreases, and the output to the NOR circuit NR3 goes high.

Adequate time is required from when the input control signal IN changes from high to low until the high-side transistor Q1 switches from the on state to the off state. Accordingly, at a point in time when the input control signal IN changes from high to low, the transistor Q1 is not yet switched off, and hence the node LX remains high. Therefore, the output of the first detection circuit 130 remains high, and the output of the NOR circuit NR3 remains low. As a result, the transistor Q2 is maintained in the off state.

When the transistor Q1 switches from the on state to the off state after the adequate time, the voltage of the node LX drops. With the drop in the voltage of the node LX, Vds (Q30) drops, and the transistor Q30 switches from the on state to the off state. Here, Vds(30) is the drain-source voltage of the transistor Q30. When the transistor Q30 switches to the off state, the output voltage to the NOR circuit NR3 becomes voltage VLS×R2/(R1+R2). When the value of this voltage is lower than a threshold voltage of the NOR circuit NR3, the output of the NOR circuit NR3 changes from low to high.

When the output of the NOR circuit NR3 goes high, the output of the inverter circuit INV4 goes low, whereby the transistor Q21 is switched on, and the transistor Q22 is switched off. Thus, the node LO goes high, and the transistor Q2 switches from the off state to the on state. As can be seen from the above, in this embodiment, after the first detection circuit 130 detects the switching of the transistor Q1 from the on state to the off state, the transistor Q2 switches from the off state to the on state. For this purpose, a high-side signal which is operating with a floating reference is converted to a signal with a ground reference and inputted to the NOR circuit NR3 by the first detection circuit 130.

(2) Next, it is assumed that from the above state, the input control signal IN changes from low to high. On the low side, the high-level input control signal IN is inputted to the NOR circuit NR3, and the output of the NOR circuit NR3 goes low. As a result, the output of the inverter circuit INV4 goes high, whereby the transistor Q21 is switched off, the transistor Q22 is switched on, and the node LO goes low. Hence, the transistor switches from the on state to the off state.

On the other hand, on the high side, the output of the inverter circuit INV2 goes low, and a low-level signal is inputted to the NOR circuit NR2. Since an output from the second detection circuit 140 is inputted to this NOR circuit NR2, an output of the NOR circuit NR2 does not go high unless the output from the second detection circuit 140 goes low.

Namely, only after the voltage of the node LO changes from high to low and the transistor Q2 switches from the on state to the off state, the output of the NOR circuit NR2 goes high. When the node LO changes to low, the output of the NOR circuit NR2 goes high, whereby the output of the inverter circuit INV3 goes low and the output of the level shift circuit 120 also goes low. Hence, the transistor Q11 is switched on, and the transistor Q12 is switched off, whereby the node HO goes high. Consequently, the transistor Q1 switches from the off state to the on state.

As can be seen from the above, in this embodiment, after the second detection circuit 140 detects the switching of the transistor Q2 from the on state to the off state, the transistor Q1 switches from the off state to the on state. Namely, the second detection circuit 140 detects the switching of the transistor Q2 to the off state by monitoring the voltage of the node LO.

Figure 6:
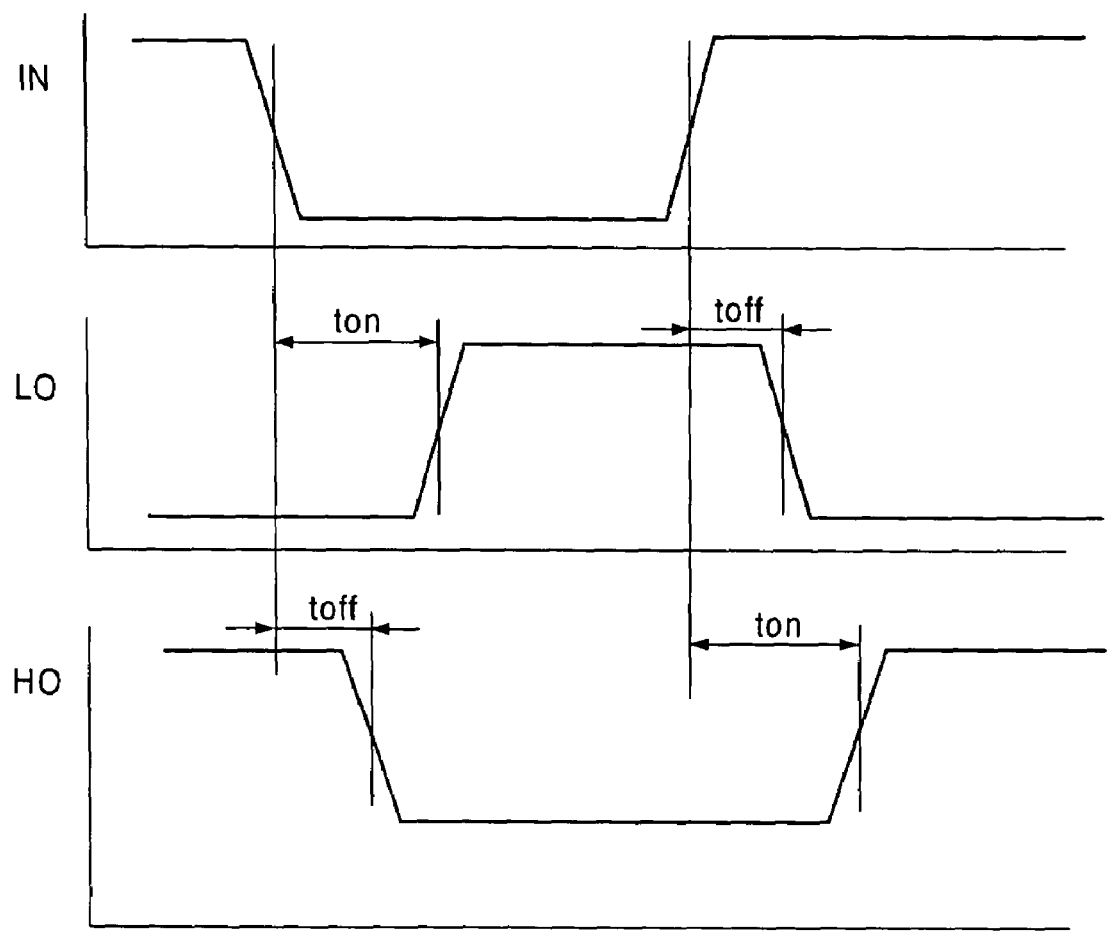
FIG. 6 is a diagram showing an example of operation waveforms of the DC-DC converter control circuit in FIG. 5.

FIG. 6 is a diagram showing an example of operation waveforms of the DC-DC converter control circuit shown in FIG. 5. FIG. 6 shows level changes of the node LO and the node HO when the input control signal IN changes from high to low and thereafter changes from low to high.

Figure 1:
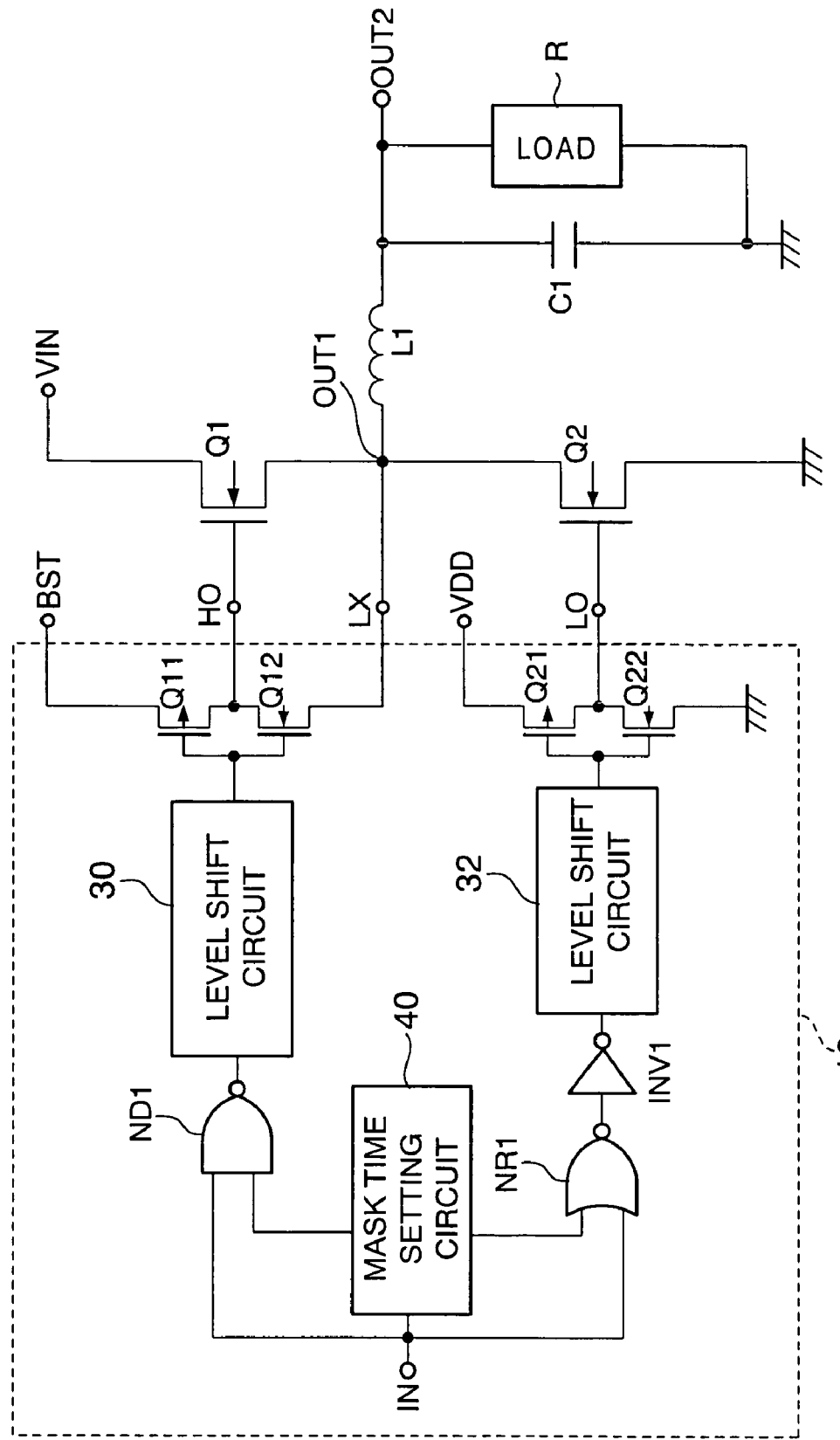
FIG. 1 is a diagram showing the circuit configuration of a related DC-DC converter control circuit.
Figure 2:
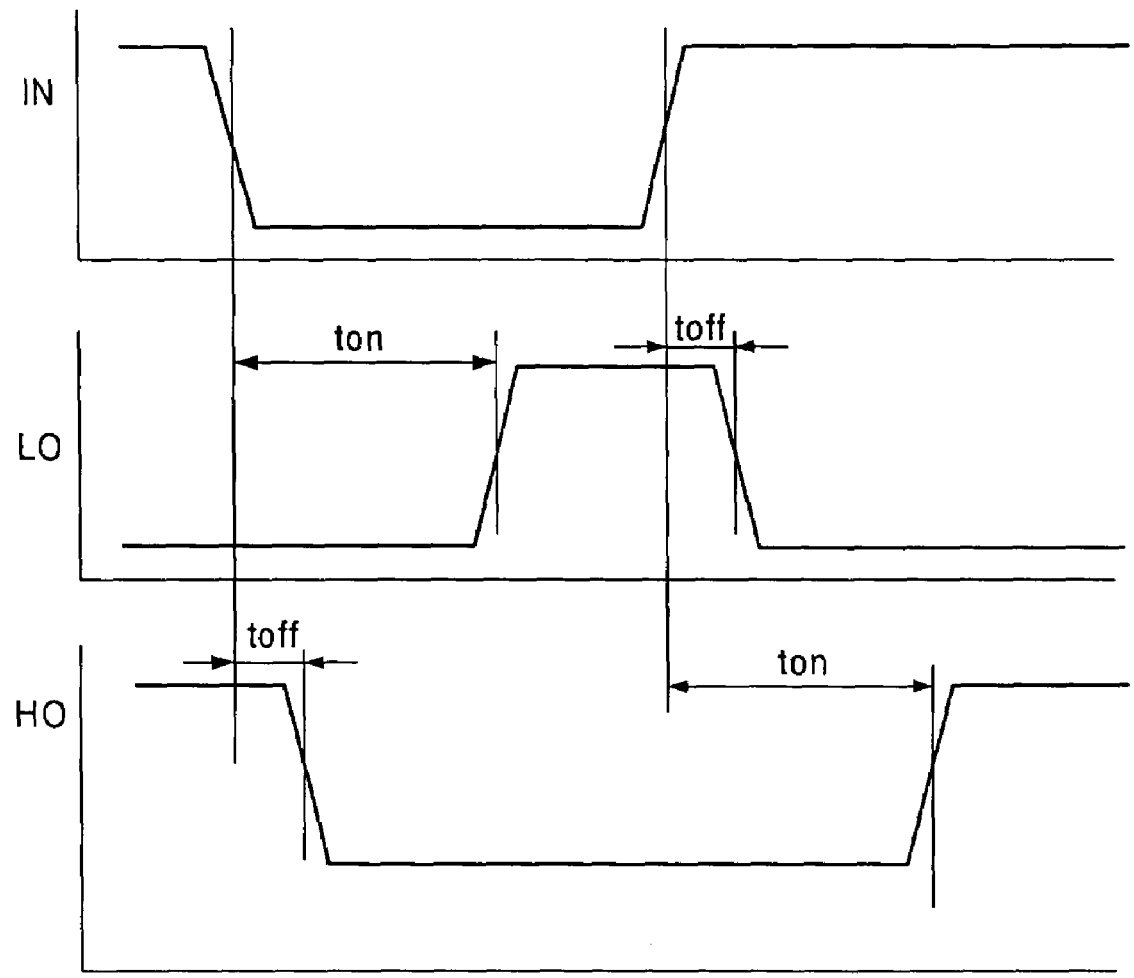
FIG. 2 is a diagram showing an example of operation waveforms of the DC-DC converter control circuit in FIG. 1.

As can be seen from a comparison with FIG. 2, a delay time ton when the transistor Q1 and the transistor Q2 each switch from the off state to the on state is shorter than that in the related art. Namely, when the input control signal IN changes from high to low, the node HO changes from high to low after being delayed for a delay time toff, whereas the node LO changes from low to high after being delayed for the delay time ton. According to the DC-DC converter control circuit according to this embodiment, the delay time ton is shorter than that of the related DC-DC converter control circuit.

This applies to a case where the input control signal IN changes from low to high, and the delay time ton of the high-side transistor Q1 is shorter than that in the related art. Hence, according to the DC-DC converter control circuit and the DC-DC converter according to this embodiment, fast responsiveness can be achieved.

Moreover, since the gate voltage of the transistor Q30 is used as a low-voltage power source, the DC-DC converter control circuit according to this embodiment can be realized by using a MISFET fabricated by a fine process, and the operating range for the input voltage VIN can be increased.

It should be mentioned that the present invention is not limited to the aforementioned embodiment, and various changes may be made therein. For example, although the MISFET is used as an example of the switching element in the aforementioned embodiment, the switching element can be realized by some other element. Moreover, the circuit configuration of the first detection circuit 130 is not limited to the configuration in the aforementioned embodiment, and an equivalent function may be realized by some other circuit configuration.

What is claimed is:

1. A DC-DC converter control circuit, comprising:
    a first switching element having a first terminal to which a first voltage is supplied and a second terminal which is connected to an output node;
    a second switching element having a first terminal which is connected to the output node and a second terminal to which a second voltage lower than the first voltage is supplied; and
    a control circuit which outputs a first control signal to a control terminal of the first switching element and outputs a second control signal to a control signal to a control terminal of the second switching element so as to control on/off states of the first switching element and the second switching element,
    wherein the control circuit comprises a first detection circuit which monitors a voltage of the output node and which determines that the first switching element is switched to the off state when the voltage of the output node is low, and
    when switching the second switching element from the off state to the on state, the control circuit switches the second switching element from the off state to the on state after the first detection circuit determines that the first switching element is switched to the off state.

2. The DC-DC converter control circuit according to claim 1, wherein the first detection circuit comprises:
    a first resistance one end of which is connected to the output node;
    a third switching element having a first terminal which is connected to the other end of the first resistance and a control terminal to which a third voltage is supplied; and
    a second resistance one end of which is connected to a second terminal of the third switching element, wherein a fourth voltage is supplied to the other end of the second resistance.

3. The DC-DC converter control circuit according to claim 2, wherein the control circuit switches the first switching element from the off state to the on state after detecting that the second switching element is in the off state when switching the first switching element from the off state to the on state.

4. The DC-DC converter control circuit according to claim 3, wherein the control circuit comprises a second detection circuit which monitors a voltage of the control terminal of the second switching element and which detects whether the second switching element is in the off state based on a change of the voltage of the control terminal.

5. The DC-DC converter control circuit according to claim 4, wherein the second detection circuit determines that the second switching element is switched to the off-state when the voltage of the control terminal of the second switching element is low.

6. A DC-DC converter control circuit, comprising:
    a first switching element having a first terminal to which a first voltage is supplied and a second terminal which is connected to an output node;
    a second switching element having a first terminal which is connected to the output node and a second terminal to which a second voltage lower than the first voltage is supplied; and
    a feedback circuit which compares a voltage of the output node with a reference voltage so as to generate a first control signal, wherein the feedback circuit outputs the first control signal; and
    a control circuit to which the first control signal is inputted and which controls a second control signal to be outputted to a control terminal of the first switching element and a third control signal to be outputted to a control terminal of the second switching element based on the first control signal so as to control on/off states of the first switching element and the second switching element,
    wherein the control circuit comprises a first detection circuit which monitors a voltage of the output node and which determines that the first switching element is switched to the off state when the voltage of the output node is low, and when switching the second switching element from the off state to the on state, the control circuit switches the second switching element from the off state to the on state after the first detection circuit determines that the first switching element is switched to the off state.

7. The DC-DC converter according to claim 6, wherein the first detection circuit comprises:
   a first resistance one end of which is connected to the output node;
   a third switching element having a first terminal which is connected to the other end of the first resistance and a control terminal to which a third voltage is supplied; and
   a second resistance one end of which is connected to a second terminal of the third switching element, wherein a fourth voltage is supplied to the other end of the second resistance.

8. The DC-DC converter according to claims 7, wherein the control circuit switches the first switching element from the off state to the on state after detecting that the second switching element is in the off state when switching the first switching element from the off state to the on state.

9. The DC-DC converter according to claim 8, wherein the control circuit comprises a second detection circuit which monitors a voltage of the control terminal of the second switching element and which detects whether the second switching element is in the off state based on a change of the voltage of the control terminal.

10. The DC-DC converter according to claim 9, wherein the second detection circuit determines that the second switching element is switched to the off-state when the voltage of the control terminal of the second switching element is low.

* * * * *